US008064514B2

(12) United States Patent
Lochbaum et al.

(10) Patent No.: US 8,064,514 B2
(45) Date of Patent: Nov. 22, 2011

(54) SYSTEM AND METHOD FOR DYNAMICALLY ADJUSTING BANDWIDTH BETWEEN MULTIPLE VIDEO STREAMS OF VIDEOCONFERENCE

(75) Inventors: Andrew Stewart Lochbaum, Austin, TX (US); Anthony James Catanzaro, Cedar Park, TX (US)

(73) Assignee: Polycom, Inc., Pleasanton, CA (US)

( * ) Notice: Subject to any disclaimer, the term of this patent is extended or adjusted under 35 U.S.C. 154(b) by 1600 days.

(21) Appl. No.: 11/277,535

(22) Filed: Mar. 27, 2006

(65) Prior Publication Data

US 2007/0263072 A1 Nov. 15, 2007

(51) Int. Cl.
*H04B 1/66* (2006.01)
(52) U.S. Cl. ............. 375/240; 375/240.01; 375/240.02; 370/260; 348/14.01; 348/14.08; 348/14.1
(58) Field of Classification Search ................. None
See application file for complete search history.

(56) References Cited

U.S. PATENT DOCUMENTS

| 5,150,209 A * | 9/1992 | Baker et al. ............. 375/240.02 |
| 5,303,288 A | 4/1994 | Duffy et al. |
| 5,995,490 A | 11/1999 | Shaffer et al. |
| 2004/0179591 A1* | 9/2004 | Wenger et al. ........... 375/240.01 |

OTHER PUBLICATIONS

Picture Tel, "Picture Tel(R) 600 Series iPower System Software Version 3.0 Release Bulletin," dated Aug. 24, 2001, 13-pages.
Polycom, Inc., Administrator's Guide for the VSX Series: Version 8.0.3, dated Oct. 2005, pp. i, ii, v, and 4-10 through 4-13.

* cited by examiner

*Primary Examiner* — David C. Payne
*Assistant Examiner* — Adolf Dsouza
(74) *Attorney, Agent, or Firm* — Wong, Cabello, Lutsch, Rutherford & Brucculeri, LLP

(57) ABSTRACT

A videoconferencing unit includes first and second encoder that each encodes a video stream of frames and generates variables indicating changes between frames of the video streams. The unit also includes a controller operatively coupled to the first and second encoders. The controller compares the variables from the encoders and determines first and second bit rates for the first and second encoders based on the comparison. Then, the controller sets the first and second encoders to the first and second bit rates, respectively. Preferably, comparing the variables, determining the bit rates, and setting the bit rates are dynamically repeated as the unit operates. In addition, the dynamic repetition is preferably allowed or limited to one or more predetermined intervals of time.

21 Claims, 4 Drawing Sheets

SYSTEM AND METHOD FOR DYNAMICALLY ADJUSTING BANDWIDTH BETWEEN MULTIPLE VIDEO STREAMS OF VIDEOCONFERENCE

FIELD OF THE DISCLOSURE

The subject matter of the present disclosure relates to a system and method for dynamically adjusting bandwidth between multiple video streams of a videoconference.

BACKGROUND OF THE DISCLOSURE

A videoconferencing system may handle video from two sources at the same time. One example of a prior art system for handling video from two sources is the iPower system available from Polycom, Inc., the Assignee of the present disclosure. The iPower system allows user to include video of participants along with content in a videoconferencing meeting. In particular, the iPower system provides a dual images function. With the dual images function, the iPower system shares bandwidth between video of participants and video of content when content is selected to be shown. This allows conference participants to see other participants and visual content simultaneously.

In the iPower system, one video stream (e.g., video of participants) on one of the encoders is deemed more important than the other video stream (e.g., content). The iPower system receives feedback only from the one encoder associated with the video stream deemed more important. The feedback is in the form of differences between frames of the more important video stream. The iPower system has a table that describes what percentage of the bandwidth to allocate to the one encoder deemed more important. The feedback and total video rate are used to calculate an index that is used to retrieve a percentage value from the table. The bit rate for the one encoder deemed more important is then calculated as the total video rate multiplied by the percentage value retrieved from the table. The bit rate of the other encoder is set to the remainder of the bandwidth.

In a videoconference, however, a relatively fixed amount of bandwidth is typically available for video. When a new video stream is added or when multiple video streams are present, the prior art iPower system selects only one video source as important and statically divides the available bandwidth between the video sources. As a result, the video quality of one or both of the sources can suffer.

The subject matter of the present disclosure is directed to overcoming, or at least reducing the effects of, one or more of the problems set forth above.

SUMMARY OF THE DISCLOSURE

A videoconferencing unit includes first and second encoders that each encodes a video stream of frames and generates variables indicating changes between frames of the video streams. The unit also includes a controller operatively coupled to the first and second encoders. The controller compares the variables from the encoders and determines first and second bit rates for the first and second encoders based on the comparison. Then, the controller sets the first and second encoders to the first and second bit rates, respectively. Preferably, comparing the variables, determining the bit rates, and setting the bit rates are dynamically repeated as the unit operates. In addition, the dynamic repetition is preferably allowed or limited to one or more predetermined intervals of time so that changes to the bit rates of the encoders occur in a relatively consistent manner.

The foregoing summary is not intended to summarize each potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which.

Figure 1:
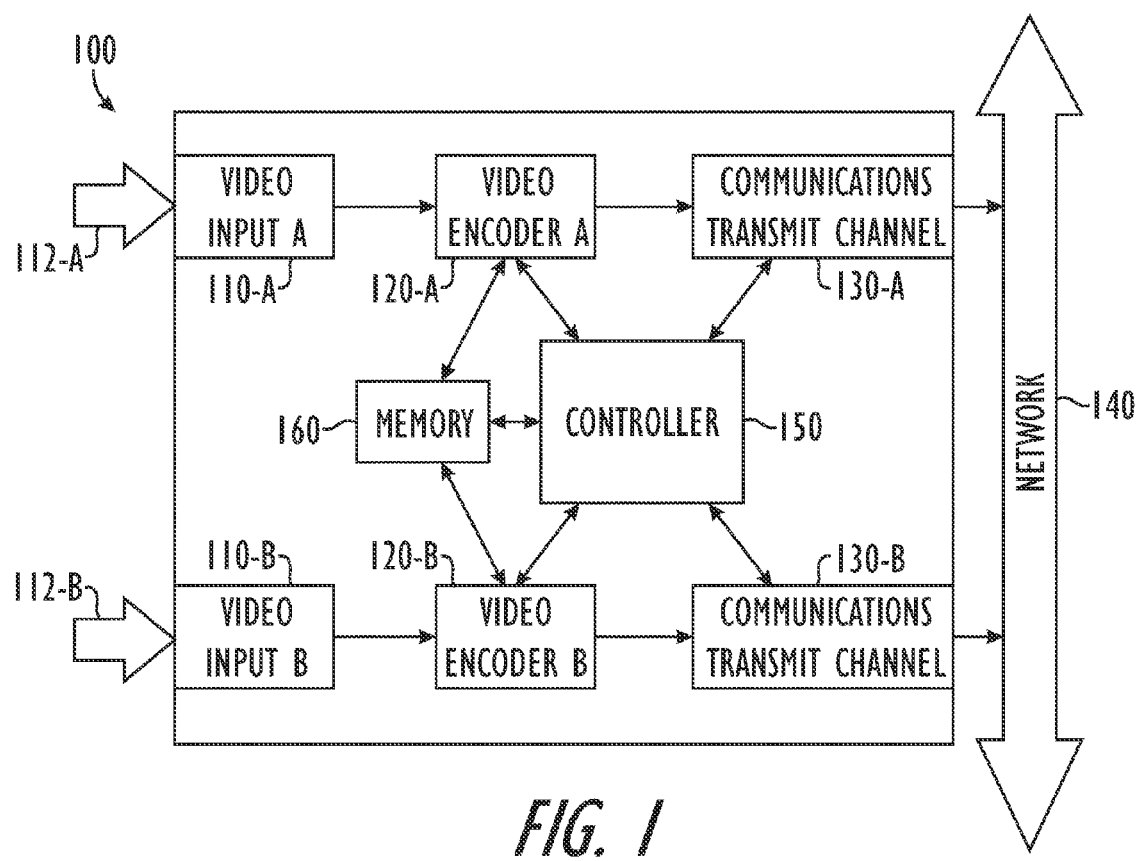
FIG. 1 illustrates a schematic of a videoconferencing unit according to certain teachings of the present disclosure.

While the subject matter of the present disclosure is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. §112.

DETAILED DESCRIPTION

Referring to FIG. 1, a schematic of a videoconferencing unit 100 according to certain teachings of the present disclosure is illustrated. The videoconferencing unit 100 includes video inputs 110A-B, video encoders 120A-B, communications transmit channels 130A-B, a controller 150, and a memory 160. In one embodiment, the videoconferencing unit 100 can be a point-to-point control unit that provides videoconferencing between endpoints. In another embodiment, the videoconferencing unit 100 can be a Multipoint Control Unit (MCU). The conferencing unit 100 can support any suitable protocol known in the art, such as the H.239 standardized protocol defined by the International Telecommunication Union (ITU).

In one embodiment, the video provided to the first video input 110A can be of videoconferencing participants from a camera, while the video provided to the second video input 110B can be of content (e.g., textual annotations or whiteboard information) from a computer or other device. Although the unit 100 in the present embodiment has two encoders 120A-B, the unit 100 in other embodiments can have more than two encoders 120 and corresponding inputs 110 and channels 130. The communications transmit channels 130A-B connect to a network 140 for the videoconference, which is used to deliver video and audio to remote endpoints (not shown), such as a videoconferencing system at another location. The controller 150 configures the video inputs 110A-B, encoders 120A-B, and communication transmit channels 130A-B and monitors their states.

Figure 2:
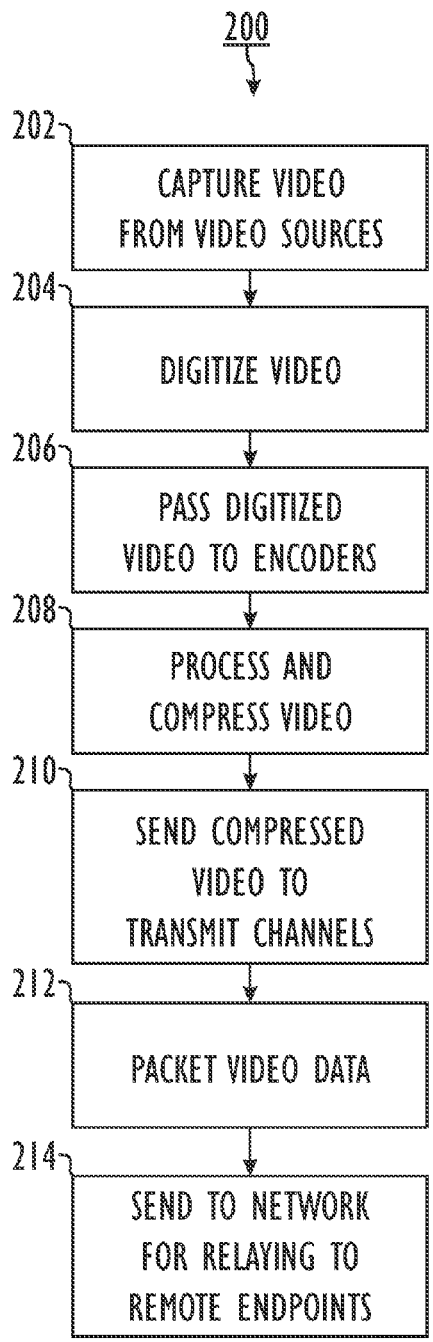
FIG. 2 illustrates an overview of the operation the videoconferencing unit in flow chart form.

Referring to FIG. 2, an overview of the operation 200 the videoconferencing unit 100 is illustrated in flow chart form. (In the discussion that follows, reference is concurrently made to the reference numerals of FIG. 1). Video sources (not shown), such as a camera and/or computer, capture or produce video and provide the video as inputs to the video inputs 110A-B (Block 202). The video inputs 110A-B digitize the video (Block 204) and pass the digitized video to the video encoders 120A-B (Block 206). The encoders 120A-B process and compress the video data (Block 208) and send the compressed video data to the communication transmit channels 130A-B (Block 210). In turn, the communications transmit channels 130A-B package the video data into standard formats (Block 212) and send the video data to a remote endpoint (not shown) via a network 140 (Block 214).

Now that the general operation of the videoconferencing unit 100 has been discussed, we now return to FIG. 1 to discuss the unit 100 in more detail. The unit 100 attempts to improve video quality among a plurality of video streams so that a greater balance in video quality can be seen among the multiple video streams. To handle the bandwidth for the multiple video streams, the controller 150 receives feedback from the video encoders 120A-B. The feedback indicates the amount of change between video frames in the two video streams separately handled by the encoders 120A-B. As discussed below, this feedback is associated with a Sum of the Absolute Difference between numerical values of the frames and is preferably in the form of a number in the range of "one" to "ten." A value of one means the associated encoder 120A-B needs little to no bandwidth, and a value of ten means the associated encoder 120A-B needs a lot of bandwidth. The controller 150, which can be embodied as software of the videoconferencing unit 100, monitors the feedback from all the encoders 120A-B and divides the available bandwidth of the unit 100 up among the encoders 120A-B based on changes indicated for the separate video streams to the encoders 120A-B. As a result, the videoconferencing unit 100 automatically adjusts bit rates applied to the encoders in order to provide more available bandwidth to the video stream that has more changes occurring within it at a given point in time.

Figure 3:
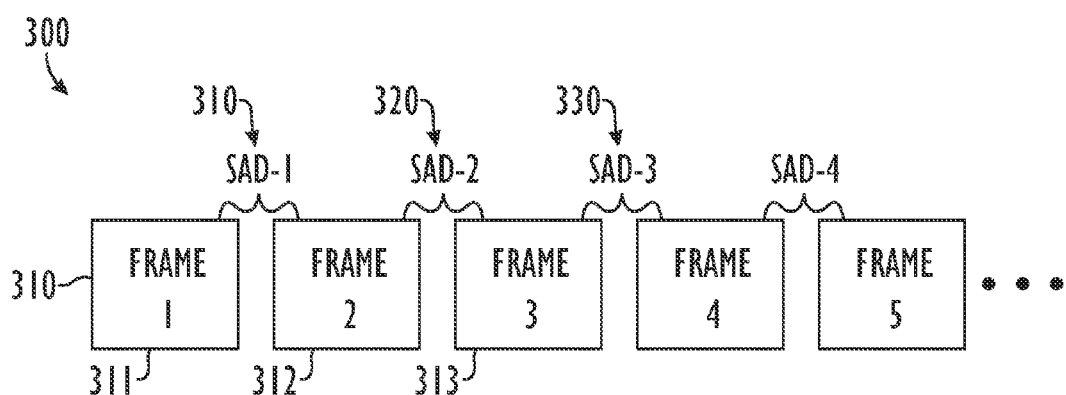
FIG. 3 illustrates a video stream having a plurality of frames.

As noted above, the encoders 120A-B receive streams of frames from the inputs 110A-B. An example of a video stream 300 of incoming frames 310 is schematically shown in FIG. 3. Each digitized frame 310 is an entire captured image and can be resolved into a numerical value. The frames 310 in the stream 300 change from frame to frame as the video being input into the encoders changes. Accordingly, the numerical values between the frames 310 also changes in the stream 300. The changes in the numerical values between the frames 310 can be computed as a Sum of the Absolute Difference (SAD) between one frame, e.g., frame 312, to a previous frame, e.g., frame 311. The Sum of the Absolute Differences, therefore, represent numerical values of how much the captured images are changing in the video stream 300 from frame to frame.

The video encoders 120A-B of FIG. 1 preferably use current techniques known in the art for encoding video. For example, the video encoders 120A-B preferably encode a full video frame and then only encode the parts of a video stream that have changed relative to previous frames. Therefore, if the input to the video encoder 120A-B is a still image, less processing is required by the encoder 120A-B to achieve the same video quality.

Figure 4:
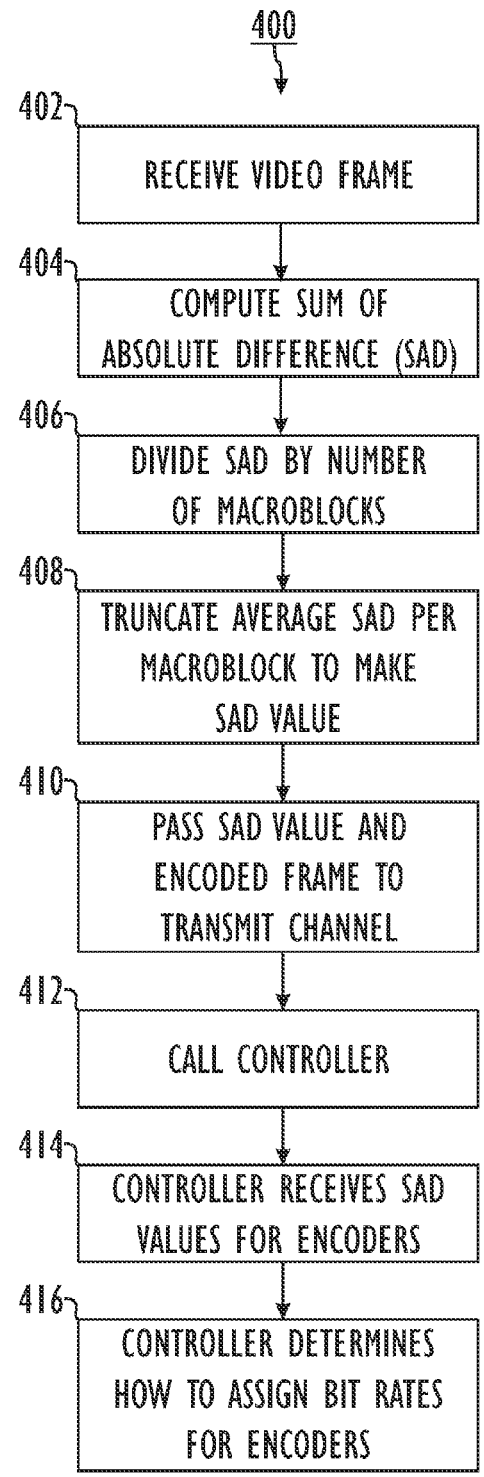
FIG. 4 illustrates a process for processing video frames with the videoconferencing unit in flow chart form.

To determine the Sum of the Absolute Differences between frames and process the video stream to determine which encoder 120A-B needs more bandwidth, the videoconferencing unit 100 performs a process 400 for processing video frames as shown in FIG. 4. (In the discussion that follows, reference is concurrently made to the reference numerals of FIG. 1). As noted previously, an encoder 120A-B receives a stream of incoming video frames from a video input 110A-B. The encoder 120A-B receives a current video frame and encodes it (Block 402). When encoding the current video frame, the encoder 120A-B computes the Sum of Absolute Differences (SAD) between the current video frame and the previous video frame (Block 404). To normalize the SAD, the encoder 120A-B divides the SAD by the number of macroblocks in the current image to obtain the average SAD per macroblock (Block 406). The macroblocks are subsections of frames and are part of the standard used by the encoders 120A-B when processing the frames. By dividing the SAD by the number of macroblocks, the resulting value for the two encoders 120A-B is normalized for comparison.

The resulting normalized value is clipped or truncated to fit into a range of "one" to "ten" or into some other numerical range (Block 408). (As used below, the truncated Sum of the Absolute Difference divided by the number of macroblocks is referred to as the SAD value). Although the range from one to ten is used, it will be appreciated that other scales can be used. An SAD value of "one" occurs when there is relatively little difference between the current frame and the previous frame. On the other hand, an SAD value of "ten" occurs when there is a relatively large amount of change between the current frame and the previous frame. The encoder 120A-B passes this SAD value along with the encoded frame to its corresponding communications transmit channel 130A-B (Block 410). Every time a compressed frame is sent to the communications transmit channel 130A-B, the controller 150 is called with the SAD value (Block 412).

The controller 150 receives the SAD values from the communication transmit channels 130A-B associated with the encoders 120A-B (Block 414). Then, the controller 150 determines how to assign or divide the bit rates to the encoders 120A-B using the SAD values received (Block 416). As discussed previously and as shown in FIG. 1, the videoconferencing unit 100 can include a plurality of encoders 120A-B that process separate video streams. Each of these streams can have different changes from frame to frame so that one of the encoders 120A-B may need or require more bandwidth than the other encoder 120A-B. To determine which encoder needs more bandwidth using the SAD values received, the controller 150 performs a process 500 shown in FIGS. 5A-5B.

Figure 5A:
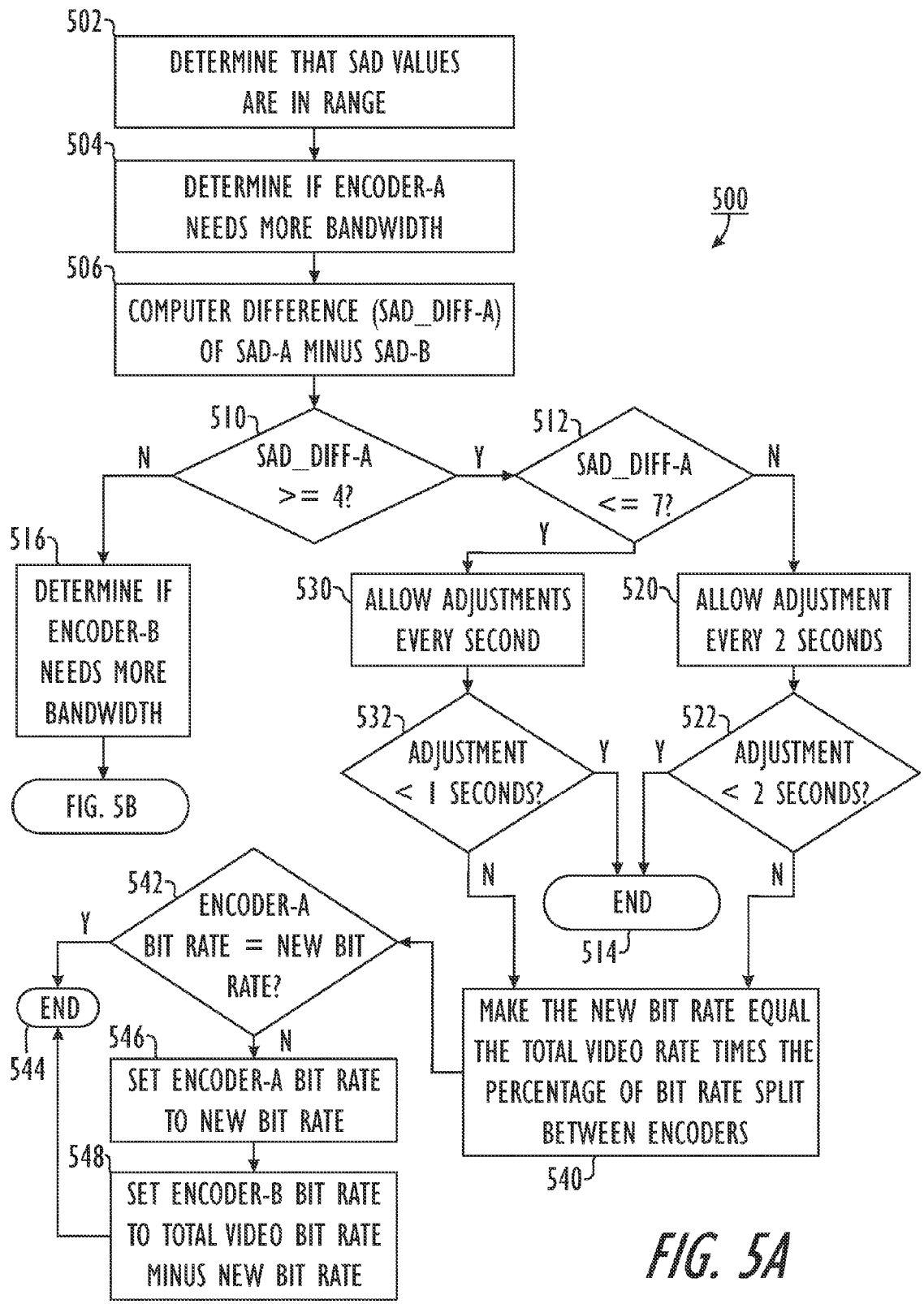
FIGS. 5A-5B illustrate a process of determining which encoder needs more bandwidth.
Figure 5B:
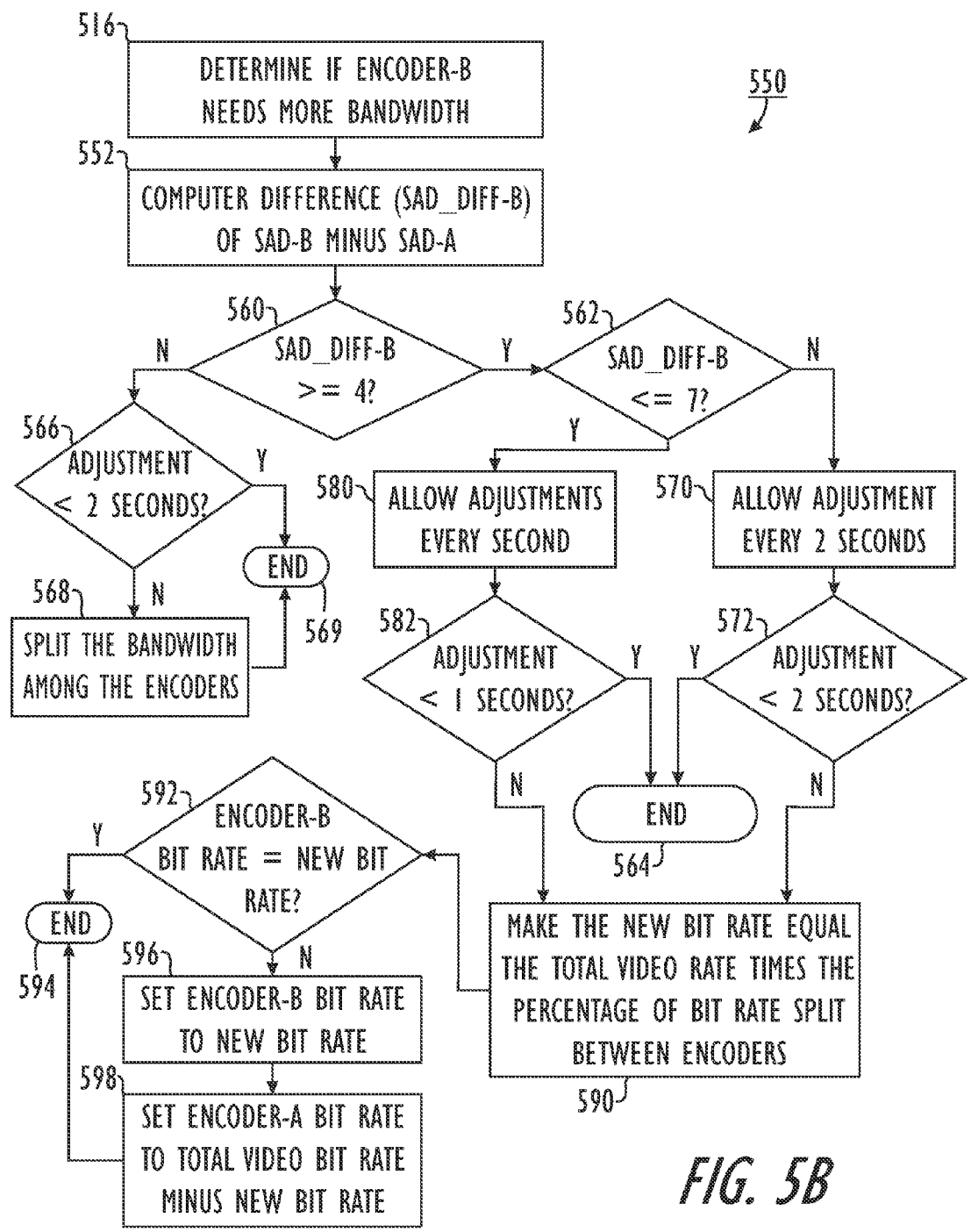

Before discussing the process 500 of FIGS. 5A-5B, it should be reiterated that the present embodiment of the unit 100 discussed herein includes two encoders 120A-B, as noted previously. Accordingly, the process 500 of FIGS. 5A-5B discussed below focuses on the use of two encoders. However, as also noted previously, the unit of the present disclosure can have more than two encoders. With the benefit of the present disclosure, however, it would be a routine undertaking of one skilled in the art to configure that the process 500 discussed below so as to compare more than two video streams and determine the bit rate needed for more than two encoders.

In the process 500, it is desirable to limit the number of bandwidth changes so the encoders 120A-B does not jump back and forth among different bit rates because the videoconferencing unit 100 may not be able to react immediately to changes in bandwidth. The decision of how frequently to adjust the bandwidths of the encoders 120A-B is dependent on the feedback (SAD values) from the encoders 120A-B. Furthermore, the decision of how frequently to adjust the bandwidths is also preferably dependent on intervals of time.

In the process 500, the controller 150 first determines whether the SAD values from the encoders 120A-B are in the appropriate range, e.g., from "one" to "ten" in the present example (Block 502). The controller 150 then determines if one encoder-A (e.g., encoder 120A) needs more bandwidth (Block 504). The controller 150 calculates SAD_Diff-A as a sum of the SAD value for encoder-A (SAD-A) minus the SAD value for encoder-B (SAD-B) (Block 506).

Then, the controller 150 determines whether the difference (SAD_Diff-A) is greater than or equal to the value of "four" (Block 510). If not, then there is not a significant change in the frames of encoder-A relative to encoder-B to warrant increasing the bit rate of encoder-A. Accordingly, the controller 150 instead determines whether encoder-B needs more bandwidth (Block 516), which is discussed below with reference to FIG. 5B.

If the difference (SAD_Diff-A) is greater or equal to "four" at Block 510, the controller 150 determines whether the difference (SAD_Diff-A) is less than or equal to "seven" (Block 512). If so, the controller 150 allows the bit rate to be adjusted every first interval, e.g., two seconds (Block 520). This first interval can be more or less than two seconds based on the implementation. In addition, this first interval may be fixed or predetermined or may be varied based on monitored parameters, operational conditions, or user-selection, for example.

Before actually adjusting the bit rate, the controller 150 first determines if the time since the last bit rate adjustment has been made is less than the first interval of two seconds (Block 522). If so, then the process does nothing and returns to receiving the next SAD values for the next frame because the process 500 has not been in the current state of adjusting the bit rate every two seconds for a long enough period of time (Block 514). If the time since the last bit rate adjustment has been made is more than two seconds at Block 522, then the controller 150 proceeds with steps for updating the bit rate discussed later.

However, if the difference (SAD_Diff-A) is greater than "seven" at Block 512, then the controller 150 allows the bit rate to be adjusted every second interval, e.g., one second (Block 530). Again, this second interval can be more or less than one seconds based on the implementation. In addition, this second interval may be fixed or predetermined or may be varied based on monitored parameters, operational conditions, or user-selection, for example. Preferably, this second interval (e.g., one second) is less than the first interval (e.g., two seconds) because the difference (SAD_Diff-A) being greater than "eight" indicates a greater need for bandwidth by encoder-A.

Before actually adjusting the bit rate, the controller 150 first determines if the time since the last bit rate adjustment has been made is less than one second (Block 532). If so, then the process does nothing and returns to receiving the next SAD values for the next frame because the process has not been in the current state of adjusting the bit rate every one second long enough (Block 514). If the time since the last bit rate adjustment has been made is more than one second at Block 532, then the controller 150 proceeds with steps for updating the bit rate discussed below.

At Block 540, the controller 150 starts the process of adjusting the bit rate assigned to the encoders 120A-B. Here, the controller 150 calculates a new bit rate value ("newBitRate") that is equal to the product of the total video rate ("TotalVideoRate") times a percentage of bit rate split between the encoders ("BitRateSplitPercent") (Block 540). In one embodiment, the "TotalVideoRate" is a fixed or predetermined value, which can be 384-kb/s, for example. In one embodiment, the "BitRateSplitPercent" is also a fixed or predetermined percentage, which can be 80-percent, for example. It is understood that these values can be different for a particular implementation. In an alternative embodiment, the controller 150 can vary the "TotalVideoRate" and the "BitRateSplitPercent" based on monitored operating parameters of the control unit, based on user-selected values, or based on other variables. For example, a user can use a graphical user interface to choose the "BitRateSplitPercent." In another example, the videoconferencing unit 100 can have software that monitors the available bandwidth, which is used to adjust the "TotalVideoRate" during operation.

Once the "newBitRate" is calculated, the controller 150 then determines whether the bit rate currently assigned to encoder-A is already equal to the "newBitRate" (Block 542). If so, then no change to the bit rate to encoder-A is needed so the process 500 ends (Block 544). Once ended, the process 500 is repeated for a subsequent frame. Repeating the process 500 can be scheduled or immediate depending on the implementation.

If the bit rate currently assigned to encoder-A is not equal to the "newBitRate", the controller 150 sets the bit rate for encoder-A to the "newBitRate" as calculated (Block 546) and sets the bit rate for encoder-B to a sum of the "TotalVideoRate" minus the "newBitRate." Then, the time value representing when the last adjustment to the bit rate has been made is set to the current time and the current process 500 ends (Block 544) so the process 500 can be repeated for calculating differences associated with new incoming frames.

As noted previously at Block 516, the difference (SAD_Diff-A) associated with encoder-A may be less than "four" in which case the controller 150 instead determines if encoder-B needs more bandwidth. FIG. 5B illustrates this process 550 in flow chart form. First, the controller 150 calculates the difference (SAD_Diff-B) as the SAD value for encoder-B (SAD-B) minus the SAD value for encoder-A (SAD-A) (Block 552).

Next, the controller 150 determines whether the difference (SAD_Diff-B) is greater than or equal to the value of "four" (Block 560). If the difference (SAD_Diff-B) is greater or equal to "four" at Block 560, the controller 150 determines whether the difference (SAD_Diff-B) is less than or equal to "seven" (Block 562). If so, the controller 150 allows the bit rate to be adjusted every two seconds (Block 570). Accordingly, the controller 150 determines if the time since the last bit rate adjustment has been made is less than two seconds (Block 572). If so, the process 550 does nothing because the process 550 has not been in the current state of adjusting the bit rate every two seconds long enough. Accordingly, the current process ends so that it can return to receiving the next SAD values for a subsequent frame (Block 564). If the time since the last bit rate adjustment has been made is more than two seconds at Block 572, then the controller 150 proceeds with steps for updating the bit rate discussed later.

At Block 580, the controller 150 allows the bit rate to be adjusted every one second if the difference (SAD_Diff-B) is greater than "seven" at Block 562. Accordingly, the controller 150 determines if the time since the last bit rate adjustment has been made is less than one second (Block 582). If so, then the process 550 does nothing and returns to receiving SAD values for a subsequent frame because the process 550 has not been in the current state of adjusting the bit rate every one second long enough (Block 564). If the time since the last bit rate adjustment has been made is more than one second at Block 582, then the controller 150 proceeds with steps for updating the bit rate discussed below.

To adjust the bit rate assigned to the encoders 120A-B, the controller 150 calculates a new bit rate value ("newBitRate") that is equal to the product of the total video rate ("TotalVideoRate") times a percentage of bit rate split between the encoders ("BitRateSplitPercent") (Block 590). In one embodiment as noted previously, the "TotalVideoRate" is a predetermined value of 384-kb/s, and the "BitRateSplitPercent" is set at 80-percent.

The controller 150 then determines whether the bit rate currently assigned to encoder-B is equal to the "newBitRate" (Block 592). If so, then no change to the bit rate to encoder-B is needed so that the process 550 ends to be repeated for later incoming frames (Block 594). Otherwise, the controller 150 sets the bit rate for encoder-B to the "newBitRate" just calculated (Block 546) and sets the bit rate for encoder-A to a sum equal to the "TotalVideoRate" minus the "newBitRate." Then, the time value representing when the last adjustment to the bit rate has been made is set to the current time and the current process ends (Block 594) so that the process can be repeated for calculating differences associated with new incoming frames.

If the difference (SAD_Diff-B) is less than "four" at Block 560, then the controller 150 preferably determines whether the time since the last rate adjustment is greater than two seconds (Block 566). If the time since the last adjustment is more than two seconds, then the controller 150 splits the available bandwidth between the two encoders 120A-B (Block 568). Thus, each of the encoders 120A-B is assigned 50% of the "TotalVideoRate." If the time since the last adjustment is less than two seconds, however, the controller 150 does not adjust the bit rates for the encoders 120A-B because the process 550 has not been in this state long enough to warrant changing bit rates. Thus, the current process 550 ends (Block 569) so that it can be repeated for calculating differences associated with new incoming frames.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A videoconferencing unit, comprising:
   a first encoder encoding a first video stream and generating first variables indicating changes occurring in the first video stream;
   a second encoder encoding a second video stream and generating second variables indicating changes occurring in the second video stream; and
   a controller operatively coupled to the first and second encoders and configured to:
   compare the first and second variables from the first and second encoders,
   determine first and second bit rates for the first and second encoders based on the comparison,
   set the first and second encoders to the first and second determined bit rates respectively, and
   repeatedly adjust the first and second bit rates for the first and second encoders,
   wherein to repeatedly adjust the first and second bit rates, the controller is configured to:
   calculate a difference between the first and second variables,
   adjust the first and second bit rates at a first of at least two fixed intervals of time when the difference is less than a first of at least two predetermined values, and
   adjust the first and second bit rates at a second of the at least two fixed intervals of time when the difference is greater than a second of the at least two predetermined values.

2. The unit of claim 1, wherein to generate the first and second variables, the first and second encoders are each configured to:
   calculate an absolute value of a difference between a current frame and a previous frame of the video stream for the encoder.

3. The unit of claim 1, wherein to compare the first and second variables from the first and second encoders, the controller is configured to:
   calculate a difference between the first and second variables as the comparison, and
   determine whether the first or the second encoder needs a greater bit rate than the other encoder based on the difference.

4. The unit of claim 3, wherein to determine whether the first or second encoder needs a greater bit rate, the controller is configured to determine whether the difference is at least greater or less than the at least one predetermined value.

5. The unit of claim 1, wherein to determine the first and second bit rates for the first and second encoders based on the comparison, the controller is configured to:
   determine that neither the first or second encoder needs a bit rate substantially greater than the other encoder; and
   calculate new bit rate values for each of the encoders as approximately half of a total video rate.

6. The unit of claim 1, wherein to determine the first and second bit rates for the first and second encoders based on the comparison, the controller is configured to:
   calculate a first new bit rate value for one of the encoders as a product of a total video rate and a percentage; and
   calculate a second new bit rate value for the other of the encoders as a sum of the total video rate minus the first new bit rate value.

7. The unit of claim 6, wherein either the total video rate or the percentage comprises a fixed value or an adjustable value.

8. A videoconferencing method, comprising:
   generating first variables indicating changes occurring in a first video stream;
   generating second variables indicating changes occurring in a second video stream;
   comparing with a videoconferencing unit the first and second variables;
   allocating available bandwidth with the videoconferencing unit between bit rates for the first and second video streams based on the comparison; and
   repeatedly adjusting the first and second bit rates with the videoconferencing unit by:
   calculating a difference between the first and second variables,
   adjusting the first and second bit rates at a first of at least two fixed intervals of time when the difference is less than a first of at least two predetermined values, and
   adjusting the first and second bit rates at a second of the at least two fixed intervals of time when the difference is greater than a second of the at least two predetermined values.

9. The method of claim 8, wherein generating the first and second variables comprises calculating absolute values of differences between current frames and previous frames of the video streams.

10. The method of claim 8, wherein comparing the first and second variables comprises:
  calculating a difference between the first and second variables as the comparison, and
  determining whether the first or the second video stream needs a greater bit rate than the other video stream based on the difference.

11. The method of claim 10, wherein determining whether the first or the second video stream needs a greater bit rate comprises determining whether the difference is at least greater or less than the at least one predetermined value.

12. The method of claim 8, wherein comparing the first and second variables comprises:
  determining that neither the first or second video streams needs a bit rate substantially greater than the other video stream; and
  calculating new bit rate values for each of the video streams as approximately half of a total video rate.

13. The method of claim 8, wherein allocating available bandwidth between bit rates for the first and second video streams based on the comparison comprises:
  setting one of the video streams to a first bit rate value calculated as a percentage of the available bandwidth; and
  setting the other of the video streams to a second bit rate value calculated as a sum of the available bandwidth minus the first bit rate value.

14. The method of claim 13, wherein either the available bandwidth or the percentage comprises a fixed value or an adjustable value.

15. An electronically readable medium having instructions encoded thereon executable by a videoconferencing unit for performing a videoconferencing method, the method comprising:
  generating first variables indicating changes occurring in a first video stream;
  generating second variables indicating changes occurring in a second video stream;
  comparing the first and second variables;
  allocating available bandwidth between bit rates for the first and second video streams based on the comparison; and
  repeatedly adjusting the first and second bit rates with the videoconferencing unit by:
    calculating a difference between the first and second variables,
    adjusting the first and second bit rates at a first of at least two fixed intervals of time when the difference less than a first of at least two predetermined values, and
    adjusting the first and second bit rates at a second of the at least two fixed intervals of time when the difference is greater than a second of the at least two predetermined values.

16. The medium of claim 15, wherein generating the first and second variables comprises calculating absolute values of differences between current frames and previous frames of the video streams.

17. The medium of claim 15, wherein comparing the first and second variables comprises:
  calculating a difference between the first and second variables as the comparison, and
  determining whether the first or the second video stream needs a greater bit rate than the other video stream based on the difference.

18. The medium of claim 17, wherein determining whether the first or the second video stream needs a greater bit rate comprises determining whether the difference is at least greater or less than the at least one predetermined value.

19. The medium of claim 15, wherein comparing the first and second variables comprises:
  determining that neither the first or second video streams needs a bit rate substantially greater than the other video stream; and
  calculating new bit rate values for each of the video streams as approximately half of a total video rate.

20. The medium of claim 15, wherein allocating available bandwidth between bit rates for the first and second video streams based on the comparison comprises:
  setting one of the video streams to a first bit rate value calculated as a percentage of the available bandwidth; and
  setting the other of the video streams to a second bit rate value calculated as a sum of the available bandwidth minus the first bit rate value.

21. The medium of claim 20, wherein either the available bandwidth or the percentage comprises a fixed value or an adjustable value.

* * * * *